United States Patent [19]

Turner et al.

[11] 4,425,461
[45] Jan. 10, 1984

[54] DRILLING FLUIDS BASED ON A MIXTURE OF A SULFONATED THERMOPLASTIC POLYMER AND A SULFONATED ELASTOMERIC POLYMER

[75] Inventors: S. Richard Turner; Robert D. Lundberg, both of Bridgewater; Warren A. Thaler, Aberdeen, all of N.J.; Thad O. Walker, Humble, Tex.; Dennis G. Peiffer, East Brunswick, N.J.

[73] Assignee: Exxon Research and Engineering Co., Florham Park, N.J.

[21] Appl. No.: 416,936

[22] Filed: Sep. 13, 1982

[51] Int. Cl.³ .................. C08K 3/24; C08L 25/08; C09K 7/02
[52] U.S. Cl. .................. 524/400; 252/8.5 C; 252/8.5 A; 252/8.5 M; 524/423; 524/525
[58] Field of Search ............. 252/8.5 M, 8.5 C, 8.5 A; 524/400, 423, 525

[56] References Cited

U.S. PATENT DOCUMENTS

| | | | |
|---|---|---|---|
| 2,217,927 | 10/1940 | Van Campen | 252/8.5 M |
| 2,599,683 | 6/1952 | Abrams et al. | 252/8.5 M |
| 2,801,967 | 8/1957 | Wilson | 252/8.5 M |
| 3,109,847 | 11/1963 | Shaler et al. | 252/8.5 M |
| 3,210,274 | 10/1965 | Caruso | 252/8.5 M |
| 3,222,278 | 12/1965 | Harryman et al. | 252/8.5 A |
| 3,622,513 | 11/1971 | Miller | 252/8.5 M |
| 3,870,841 | 3/1975 | Makowski et al. | 524/314 |
| 3,912,683 | 10/1975 | O'Farrell | 524/574 |
| 4,007,149 | 2/1977 | Burton et al. | 524/574 |
| 4,118,360 | 10/1978 | Makowski et al. | 524/574 |

FOREIGN PATENT DOCUMENTS 682553 10/1979 U.S.S.R. ............... 252/8.5 M

OTHER PUBLICATIONS

International Publication Number WO81/00850, Published under the Patent Cooperative Treaty (PCT) Apr. 2, 1981, 44 pages spec., 5 pages drawings, pp. 1–15 relied upon.

Primary Examiner—Ronald W. Griffin
Attorney, Agent, or Firm—Richard E. Nanfeldt

[57] ABSTRACT

The present invention relates to mixtures of sulfonated thermoplastic polymers and sulfonated elastomeric polymers which function as viscosification agents when added to oil-based drilling muds which are the fluids used to maintain pressure, cool drill bits, and lift cuttings from the holes in the drilling operation for oil and gas wells. The sulfonated thermoplastic and elastomeric polymers both have about 5 to about 200 meq. of sulfonate groups per 100 grams of the sulfonated thermoplastic or elastomeric polymers, wherein the sulfonated groups are neutralized with a metallic cation or an amine or ammonium counterion. A polar cosolvent can optionally be added to the mixture of oil drilling mud and sulfonated thermoplastic and elastomeric polymers, wherein the polar cosolvent increases the solubility of the sulfonated thermoplastic and elastomeric polymer in the oil drilling mud by decreasing the strong ionic interactions between the sulfonate groups of the sulfonated polymers.

24 Claims, No Drawings

DRILLING FLUIDS BASED ON A MIXTURE OF A SULFONATED THERMOPLASTIC POLYMER AND A SULFONATED ELASTOMERIC POLYMER

FIELD OF THE INVENTION

The present invention relates to mixtures of sulfonated thermoplastic polymers and sulfonated elastomeric polymers which function as viscosification agents when added to oil-based drilling muds which are the fluids used to maintain pressure, cool drill bits, and lift cuttings from the holes in the drilling operation for oil and gas wells. The sulfonated thermoplastic and elastomeric polymers both have about 5 to about 100 meq. of sulfonate groups per 100 grams of the sulfonated thermoplastic or elastomeric polymers, wherein the sulfonated groups are neutralized with a metallic cation or an amine or ammonium counterion. A polar cosolvent can optionally be added to the mixture of oil drilling mud and sulfonated thermoplastic and elastomeric polymers, wherein the polar cosolvent increases the solubility of the sulfonated thermoplastic and elastomeric polymer in the oil drilling mud by decreasing the strong ionic interactions between the sulfonate groups of the sulfonated polymers.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine-treated clays (also as viscosification agent.

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application have heretofore not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formation. Past experience has shown that oil-based drilling fluids can provide good performance in water sensitive formations, and the state of the art systems can perform well up to about 350° F. Typically, in such formations, the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need, therefore, for drilling fluids which can maintain their viscosity and gel strength to temperatures up to and exceeding 400° F. These needs are not adequately met by the current drilling fluids, even with the oil-based drilling muds often employed.

This invention describes an approach to viscosification of oil-based drilling muds which permits the substitution of sulfonated ionomers for asbestos fines and amine clays. The resulting polymer-modified drilling muds display viscosities which are in a desirable range for drilling mud applications, good viscosities at retention after aging and gel strength from room temperature up to temperatures of 400° F. and higher, based on tests conducted for 16 hours at such temperatures.

The types of sulfonated polymers described in the present application are a mixture of sulfonated thermoplastic polymers and sulfonated elastomeric polymers.

It has also been shown that sulfonated polystyrene is very effective as a viscosifier for oil-based drilling muds at elevated temperatures as described in copending application Ser. No. 292,333 entitled "High Temperature Drilling Fluids Based on Sulfonated Thermoplastic Polymers". However, these formulas, as described in Ser. No. 292,333, provide low gel strength at room temperature to 150° F. and are not effective until thermally activated. We have found that sulfonated EPDM provides good viscosification at temperatures of about 300° F. and below when formulated in a mud based on fresh water. Higher temperatures (350° to 400° F.) encountered in accelerated aging studies for 16 hours have shown that sulfonated EPDM loses its efficacy almost completely at those higher temperatures.

It appears that until now, there has been no viscosifier which is effective at both room temperature and at 400° F. for the typical aging period of 16 hours. The instant invention will describe materials that provide excellent gel strength at both room temperature and at temperatures around 400° F. and even higher temperatures.

The preferred thermoplastic species of the instant invention is lightly sulfonated polystyrene with a sulfonate level at about 5 to about 100 meq. of sulfonate groups per 100 grams of sulfonated polymer. It is believed that this polymer is not soluble in either the hydrocarbon phase or the aqueous phase of a formulated mud and; therefore, the polymer is probably located at the interface. As a consequence, this polymer is an extremely effective viscosifier even at quite low levels.

The preferred elastomeric species of the instant invention is a lightly sulfonated elastomeric polymer such as sulfonated EPDM terpolymer or an isoprene-co-sodium styrene sulfonate copolymer with a sulfonate level at about 5 to about 100 meq. of sulfonate groups per 100 grams of sulfonated polymer.

A second facet of the instant invention relates to the use of these materials in formulations which employ high concentrations of salt in the aqueous phase. The sulfonated polystyrenes (SPS) and sulfonated isoprene co-sodium styrene sulfonate or sulfonated EPDM terpolymers which are the preferred embodiment of this invention, lose some of their efficacy in salt water. It has been found that the combination of a suitable non-ionic emulsifier with the sulfonated polymers gives formulations which are effective with salt water. Therefore, these systems give formulations which perform well at high temperatures and in the presence of salt water phases which is a highly desired objective in the drilling fluids industry.

SUMMARY OF THE INVENTION

The present invention relates to mixtures of sulfonated thermoplastic polymers and sulfonated elastomeric polymers which, in combination, extend the useful operating temperature range and function as viscosification agents when added to oil-based drilling muds which are the fluids used to maintain pressure, cool drill bits, and lift cuttings from the holes in the drilling operation for oil and gas wells. The sulfonated thermoplastic and elastomeric polymers both have about 5 to about 100 meq. of sulfonate groups per 100 grams of the sulfonated thermoplastic or elastomeric polymers, wherein the sulfonated groups are neutralized with a metallic cation or an amine or ammonium counterion. A polar cosolvent can optionally be added to the mixture of oil drilling mud and sulfonated thermoplastic and elastomeric polymers, wherein the polar cosolvent increases the solubility of the sulfonated thermoplastic and elastomeric polymer in the oil drilling mud by decreasing the strong ionic interactions between the sulfonate groups of the sulfonated polymers.

GENERAL DESCRIPTION OF THE INVENTION

The present invention describes a new class of viscosification agents for oil-based drilling muds which are used during operation of gas and oil wells, wherein these viscosification agents are mixtures of sulfonated thermoplastic and elastomeric polymers. The oil-based drilling muds of the instant invention minimally comprise, but can also include other additives, an organic liquid such as an oil, fresh water or salt water, an emulsifier, a wetting agent, a weighting material and mixtures of the sulfonated thermoplastic and elastomeric polymers. In general, the oil-based drilling mud has a specific gravity of about 7 pounds per gallon to about 20 pounds per gallon, more preferably about 10 to about 16, and most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; and about ½ to about 5 lb/bbl. of a wetting agent; and weighting material (barium sulfate or barite) necessary to give the desired mud density; which comprises less than about 800 lb/bbl. of barium sulfate, more preferably about 5 to about 750, and most preferably about 10 to about 700; and about 0.25 to about 4 lb/bbl. of the mixture of sulfonated thermoplastic and elastomeric polymers.

The oil employed in the oil-based drilling mud is generally a No. 2 diesel fuel, but it can be other commercially available hydrocarbon solvents such as kerosene, fuel oils or selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkyl-aryl sulfonate.

Typical, but non-limiting examples of a weighting material which can be readily employed is barite or a barium sulfate which may optionally be surface-treated with other cations, such as calcium.

The neutralized sulfonated thermoplastic polymers employed in the oil-based drilling muds are derived from polystyrene-type thermoplastic polymers which are selected from the group consisting of polystyrene, poly-t-butyl-styrene, polychlorostyrene, polyvinyl toluene, polyalpha-methyl styrene or co- or terpolymers of the aforementioned with each other or with acrylonitrile vinyl toluene or methylmethacrylate.

While sulfonated thermoplastics are the preferred form of this invention, there are a large number of sulfonate-containing polymers which fall within the scope of this invention. These are described in U.S. Pat. Nos. 3,870,841 and 3,931,021, which are hereby incorporated by reference. Such polymers can be prepared by direct sulfonation of the preformed polymer or by copolymerization with a sulfonate-containing monomer.

The polystyrene thermoplastics suitable for use in the practice of the invention have a glass transition temperature from about 70° C. to about 150° C., more preferably about 90° C. to about 140° C. and most preferably about 90° C. to about 120° C. These polystyrene resins have a weight average molecular weight as measured by GPC of about 5,000 to about 500,000 more preferably about 20,000 to about 350,000 and most preferably about 900,000 to about 300,000. These base polystyrene thermoplastic resins can be prepared directly by any of the known polymerization processes. The term "thermoplastic" is used in its conventional sense to mean a substantially rigid (flexural modulus > 10,000 psi) material capable of retaining the ability to flow at elevated temperatures for relatively long times.

The preferred polystyrene thermoplastic resin is a homopolymer of styrene having a number average molecular weight of about 180,000 and an intrinsic viscosity in toluene of about 0.8. These polymers are widely available commercially in large volume. A suitable material is Styron 666 manufactured by Dow Chemical Co., which affords a suitable number average molecular weight of about 105,000.

The neutralized sulfonated elastomeric polymers employed in the oil-based drilling muds are derived from unsaturated polymers which include low unsaturation elastomeric polymers such as Butyl rubber, or EPDM terpolymers and other sulfonated elastomers which are preferably neutralized.

Alternatively, other unsaturated polymers are selected from the group consisting of partially hydrogenated polyisoprenes, partially hydrogenated polybutadienes and neoprene, or sulfonated elastomeric copolymers formed by a free radical process such as isoprene cosodium styrene sulfonate (IP/NaSS).

The expression "Butyl rubber" as employed in the specification and claims, is intended to include copolymers made from a polymerization reaction mixture having therein from 70 to 99.5 percent by weight of an isoolefin which has about 4 to 7 carbon atoms, e.g., isobutylene and about 0.5 to 30 percent by weight of a conjugated multiolefin having from about 4 to 14 carbon atoms, e.g., isoprene. The resulting copolymer contains 85 to 99.8 percent by weight of combined isoolefin and 0.2 to 15 percent of combined multiolefin.

Butyl rubber generally has a Staudinger molecular weight as measured by GPC of about 20,000 to about 500,000, preferably about 25,000 to about 400,000, especially about 100,000 to about 400,000 and a Wijs Iodine No. of about 0.5 to 50, preferably 1 to 15. The preparation of Butyl rubber is described in U.S. Pat. No. 2,356,128, which is incorporated herein by reference. For the purposes of this invention, the Butyl rubber may have incorporated therein from about 0.2 to 10 percent of combined multiolefin; preferably about 0.5 to about 5 percent, more preferably, about 1 to about 4 percent, e.g., 2 percent. Illustrative of such a Butyl rubber is Exxon Butyl 365 (Exxon Chemical Co.), having a mole percent unsaturation of about 2.0 percent and a Mooney viscosity (ML, 1+8, 212° F.) of about 40 to 50.

Low molecular weight Butyl rubbers, i.e., Butyl rubbers having a viscosity average molecular weight of about 5,000 to 85,000 and a mole percent unsaturation of about 1 to about 5 percent may be sulfonated to produce the polymers useful in this invention. Preferably, these polymers have a viscosity average molecular weight as measured by GPC of about 25,000 to about 60,000.

The EPDM terpolymers are low unsaturated polymers having about 1 to about 10.0 weight percent olefinic unsaturation, more preferably about 2 to about 8, most preferably about 3 to 7 defined according to the definition as found in ASTM D-1418-64 and is intended to mean terpolymers containing ethylene and propylene in the backbone and a diene in the side chain. Illustrative methods for producing these terpolymers are found in U.S. Pat. No. 3,280,082; British Pat. No. 1,030,289 and French Pat. No. 1,386,600, which are herein incorporated by reference. The preferred polymers contain about 40 to about 75 weight percent ethylene and about 1 to about 10 weight percent of a diene monomer, the balance of the polymer being propylene. Preferably, the polymer contains about 45 to about 70 weight percent ethylene, e.g., 50 weight percent and about 2.6 to about 8.0 weight percent diene monomer, e.g., 5.0 weight percent. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene and methyl tetrahydroindene.

A typical EPDM terpolymer is Vistalon 2504 (Exxon Chemical Co.) a terpolymer having a Mooney viscosity (ML, 1+8, 212° F.) of about 40 and having an ethylene content of about 50 weight percent and a 5-ethylidene-2-norbornene content of about 5.0 weight percent. The $\overline{M}_n$ as measured by GPC of Vistalon 2504 is about 47,000, the $\overline{M}_v$ as measured by GPC is about 145,000 and the $\overline{M}_w$ as measured by GPC is about 174,000.

Another EPDM terpolymer, Vistalon 2504-20, is derived from Vistalon 2504 (Exxon Chemical Co.) by a controlled extrusion process, wherein the resultant Mooney viscosity at 212° F. is about 20. The $\overline{M}_n$ as measured by GPC of Vistalon 2504-20 is about 26,000, the $\overline{M}_v$ as measured by GPC is about 90,000 and the $\overline{M}_w$ as measured by GPC is about 125,000.

Nordel 1320 (DuPont) is another terpolymer having a Mooney viscosity at 212° F. of about 25 and having about 53 weight percent of ethylene, about 3.5 weight percent of 1,4-hexadiene and about 43.5 weight percent of propylene.

The EPDM terpolymers of this invention have a number average molecular weight ($\overline{M}_n$) as measured by GPC of about 10,000 to about 200,000, more preferably of about 15,000 to about 100,000 most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}_v$ as measured by GPC of the EPDM terpolymer is preferably below about 350,000 and more preferably below about 300,000. The $\overline{M}_w$ as measured by GPC of the EPDM terpolymer is preferably below about 500,000 and more preferably below about 350,000.

The thermoplastic or elastomeric polymers are sulfonated by a process in a non-reactive solvent such as a chlorinated aliphatic solvent, chlorinated aromatic hydrocarbon, or an aliphatic hydrocarbon such as carbon tetrachloride, dichloroethane or chlorobenzene. The preferred solvents are the lower boiling chlorinated hydrocarbons. A sulfonating agent is added to the solution of the polymer and a non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, herein incorporated by reference. These sulfonating agents are selected from an acyl sulfate, a mixture of sulfuric acid and an acid anhydride or a complex of sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are dioxane, tetrahydrofuran, tetrahydrothiopene or triethyl phosphate. The most preferred sulfonation agent for this invention is an acyl sulfate selected from the group consisting of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated thermoplastic or elastomeric polymer has about 5 to about 100 meq. sulfonate groups per 100 grams of sulfonated polymer, more preferably about 8 to about 60; and most preferably about 10 to about 45. The range of sulfonate content which can be considered does vary over an extremely broad lattitude; however, it has been observed that in those systems of high sulfonation level, there is great difficulty in dissolving the sulfonated polymers and there can be very adverse effects in terms of the interaction of the sulfonated polymer with the barite weighting agent and with the other components of the drilling mud. Therefore, there is clearly an optimum level of sulfonation content which may vary from one sulfonated backbone to another, but for sulfonated polystyrene, it is in the most preferred embodiment of the invention as described above. The meq. of sulfonate groups per 100 grams of sulfonated thermoplastic or elastomeric polymer is determined by both titration of the polymeric sulfonate acid and Dietert Sulfur analysis. In the titration of the unneutralized sulfonate, the polymer is dissolved in solvent consisting of 95 parts by volume of toluene and 5 parts by volume of methanol at a concentration level of 50 grams per liter of solvent. The unneutralized sulfonate is titrated with ethanolic sodium hydroxide to an Alizarin-Thymolphthalein endpoint.

The unneutralized sulfonated thermoplastic or elastomeric polymer is hydrolytically stable. Hydrolytically stable means that the unneutralized sulfonate will not be eliminated under neutral or slightly basic conditions to a neutral moiety which is incapable of being converted to highly ionic functionality.

Neutralization of the unneutralized sulfonate groups of the sulfonated thermoplastic or elastomeric polymer is done by the addition of a solution of a basic salt to the unneutralized sulfonated thermoplastic polymer dissolved in the mixture of the aliphatic alcohol and nonreactive solvent. The basic salt is dissolved in a binary solvent system consisting of water and/or an aliphatic alcohol. The counterion of the basic salt is selected from the group consisting of antimony, iron, aluminum, lead and Groups IA, IIA, IB and IIB of the Periodic Table of Elements and mixtures thereof, as well as ammonium and amine counterions. The preferred cations include zinc, magnesium, sodium, lead, barium, calcium and ammonium cations, wherein zinc, magnesium and sodium are the most preferred cations. The anion of the basic salt is selected from a carboxylic acid having from about 1 to about 4 carbon atoms, a hydroxide, or alkoxide and mixtures thereof. The preferred neutralizing agent is a metal acetate, more preferably sodium acetate. Sufficient metal salt of the carboxylic acid is added to the solution of the unneutralized sulfonated thermoplastic or elastomeric polymer to effect neutralization. It is preferable to neutralize at least 95 percent of the sulfonate groups, more preferably about 98 percent, most preferably 100 percent.

Examples of metal oxides useul in preparing metal sulfonates are MgO, CaO, BaO, ZnO, Ag$_2$O, PbO$_2$ and Pb$_3$O$_4$. Useful examples of metal hydroxides are NaOH, KOH, LiOH, Mg(OH)$_2$ and Ba(OH)$_2$.

In addition to the sulfonation/neutralization of polystyrene, an alternate approach to such polymers involves the copolymerization of sulfonate-containing monomers with styrene to yield polymers having the appropriate levels of sulfonate groups. The copolymerization chemistry to obtain such material is similar to pending copolymerization applications U.S. Ser. Nos. 117,197 (now abandoned); 117,198 (now abandoned) and 117,199 (now abandoned), which are hereby incorporated by reference. The sulfonate-containing styrene polymers obtained via this approach are also effective in this invention.

This solid elastomeric sulfonated co- or terpolymers formed by a free radical process which are useful in the drilling mud formulations comprise at least 80 percent by weight of at least one conjugated diene having from 4 to 12 carbon atoms and a minor proportion of a metal or amine neutralized sulfonate monomer characterized by the formulae:

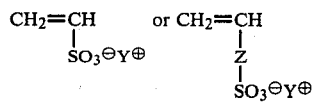

wherein Z is ∅ or

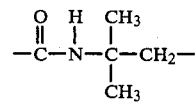

and Y$^\oplus$ is a cation selected from Groups IA, IIA, IB and IIB of the Periodic Table or an amine of the formula:

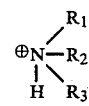

where R$_1$ R$_2$, and R$_3$ can be aliphatic groups of C$_1$ to C$_{12}$ or hydrogen, the co- or terpolymer being water insoluble having about 18 to about 100 meq. of sulfonate groups per 100 grams.

The monomers used for the elastomeric component in the free radical emulsion copolymerization process are conjugated dienes, which are copolymerized with sulfonate-containing monomers.

In general, the conjugated diene and sulfonate-containing monomer are dispersed in a water phase in the presence of a water soluble initiator or a redox system which has one component soluble in the oil phase and one component soluble in the water phase, and either with or without surfactant, wherein the temperature is sufficient to initiate polymerization. The resultant latex is coagulated usually by the addition of an aqueous salt solution and the recovered co- or terpolymer is washed with water and subsequently dried under vacuum at room temperature. Alternatively, the latex can be coagulated by the addition of methanol.

The sulfonated elastomeric co- or terpolymers formed from the free radical emulsion copolymerization process of the instant invention can be generally described as having an $\overline{M}_n$ of about 5,000 to about 500,000, more preferably about 10,000 to about 200,000. The co- or terpolymers of the instant invention contain about 18 to about 100 meq. of sulfonate groups per 100 grams of polymer, more preferably, about 18 to about 90, and most preferbly about 20 to about 80. Typical, but non-limiting examples of the copolymers which can be formed by the instant free radical emulsion copolymerization process are: butadiene/sodium styrene sulfonate copolymer, iosprene/sodium styrene sulfonate copolymer, butadiene/sodium vinyl sulfonate, isoprene/sodium vinyl sulfonate copolymer. The presence of some gel is not detrimental to the performance of the elastomeric copolymer. The sodium vinyl, sulfonate copolymers are more difficult to prepare and thus less preferred. Obviously, a large number of copolymers and even terpolymers can be formed by the instant free radical copolymerization process. Typically, the copolymerization of any conjugated diene can be readily copolymerized with any sulfonate-containing monomer, as is defined herein. Terpolymers with styrene, acrylonitrile, vinyl chloride as the termonomers with the aforementioned dienes are also contemplated provided that no more than 10 weight percent of the termonomer is combined therein.

The conjugated dienes are generally defined as acyclic conjugated dienes containing from about 4 to about 10 carbon atoms, more preferably about 4 to 6 carbon atoms. Typical, but non-limiting examples of acyclic conjugated dienes are piperidene, 1,3-butadiene, isoprene, 2,3-dimethyl-1,3-butadiene, 1,3-pentadiene, 2-methyl-1,3-pentadiene, 2,3-dimethyl-1,3-pentadiene, 3-methyl-1,3-pentadiene, 2-phenyl butadiene, chloroprene and piperidene. Typical, but non-limiting examples of cyclic conjugated dienes are cyclopentadiene and methyl cyclopentadiene. The preferred conjugated dienes of the instant invention are selected from the group consisting of 1,3-butadiene, isoprene and chloroprene. In the formation of the sulfonate-containing copolymer, one copolymerizes one of the aforementioned conjugated dienes with the sulfonate-containing monomer. Sulfonate-containing terpolymers can be readily formed by copolymerizing the sulfonate-containing monomer with a mixture of two of the above-identified conjugated dienes.

The sulfonate-containing monomers which are water soluble can be generally described as a monomer having unsaturation and a metal or amine sulfonate group. The metal or amine neutralized sulfonate monomer is characterized by the formula:

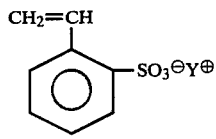

wherein $Y^\oplus$ is a cation selected from Groups IA, IIA, IB and IIB of the Periodic Table or an amine of the formula:

where $R_1$, $R_2$, and $R_3$ can be aliphatic groups of $C_1$ to $C_{12}$ or hydrogen. Particularly suitable metal cations are sodium, potassium and zinc, and an especially preferred metal cation is sodium.

An especially preferred sulfonate-containing monomer is metal styrene sulfonate. A typical, but non-limiting example of suitable sulfonate-containing monomer is:

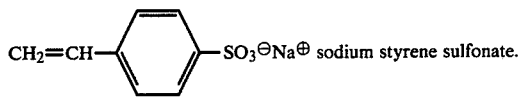

The molar ratio of sulfonate-containing monomer to conjugated diene is about 1/200 to about 1/5, more preferably about 1/150 to about 1/6, and most preferably about 1/100 to about 1/9.

A variety of free radical catalysts can be employed in this invention including the water soluble varieties, potassium persulfate, ammonium persulfate, etc., and the oil/water soluble redox systems such as benzoyl peroxide/$(NH_4)_2FeSO_4$, etc.

The surfactants employed for this invention are varied and well-known in the art. The typical emulsifiers or surfactants can be employed; however, some are more effective than others in generating latices of better stability. A preferred emulsifier is sodium lauryl sulfate.

The buffering agents, if used in the instant polymerization process, are selected from the group consisting of sodium carbonate, ammonia, sodium acetate, trisodium phosphate etc. These buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfonate-containing monomer and the conjugated diene.

The free radical emulsion copolymerization of the water soluble sulfonate-containing monomer and the conjugated diene yields a stable latex, wherein the resultant water insoluble co- or terpolymer is not covalently cross-linked and possesses substantial ionic cross-linking, and has about 18 to about 100 meq. of sulfonate groups per 100 grams of polymer, more preferably about 18 to about 90. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble co- or terpolymer is recovered by filtration and substantially washed with water and dried under vacuum conditions. Alternatively, the polymer can be coagulated by precipitation with alcohol such as methanol.

The mixture of the sulfonated thermoplastic polymer and sulfonated elastomeric polymer contains about 99 to about 1 weight percent of the sulfonated thermoplastic polymer, more preferably about 95 to about 5 weight percent and most preferably about 80 to about 20 weight percent.

Alternatively, a latex of a sulfonated polymer as described in U.S. Pat. Nos. 3,912,683 and 4,007,149, which are herein incorporated by reference, could be readily employed as a convenient method of introducing the sulfonated polymer into the oil-based drilling mud.

It has been observed that the sulfonated polymers formed by sulfonation often do not readily dissolve in hydrocarbons such as diesel or oil solvent 100 neutral and similar hydrocarbon solvents. The reason that these materials do not readily dissolve is due to the strong ionic interactions which persist in these sulfonated polymers.

It has been observed that the use of appropriate polar cosolvent can dramatically aid in the preparation of such solutions. The need for such cosolvents is most dramatically demonstrated with sulfonated polymers having sulfonate contents significantly about 15 meq. per 100 grams of sulfonated polymer. Examples of such cosolvents are aliphatic alcohol hexanol, decanol and tridecyl alcohol employed at levels of from about 1 up to 20 parts by weight per 100 parts by weight of the oil employed in the drilling mud. The use of these cosolvents permits a more rapid dissolution process and a more complete solution from polymers which would normally be insoluble in a hydrocarbon diluent. It has also been observed at lower sulfonate levels, that is, 5 to 15 meq. or even higher per 100 grams of sulfonated polymer, that these polymers can be dissolved in the absence of such cosolvents. Cosolvents which are suitable in this invention have been described in U.S. Ser. No. 930,044, now abandoned, which is herein incorporated by reference.

The polar cosolvent will have a solubility parameter of at least about 8.5, more preferably at least about 9.0 and may comprise from 0.1 to 40, preferably 0.5 to 20 weight percent of the total mixture of organic liquid, ionomeric polymer and polar cosolvent. The solvent system of polar cosolvent and organic liquid in which the neutralized sulfonated polymer is dissolved contains less than about 15 weight percent of the polar cosolvent, more preferably about 2 to 10 weight percent, and most preferably about 2 to about 5 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of alcohols, amines, di- or trifunctional alcohols, amides, acetamides, phosphates, or lactones and mixtures thereof. Especially preferred polar cosolvents are aliphatic alcohols such as butanol, hexanol, octanol, decanol, dodecanol, tridecyl alcohol, 2-ethyl hexanol, etc.

EXAMPLE 1

Emulsion Copolymerization of Isoprene and Sodium Styrene Sulfonate

A 250 ml. glass pressure bottle was charged with 1.6 g. sodium lauryl sulfate, 60 ml. distilled and deareated water, 25 g. of isoprene, 2.0 g. of sodium styrene sulfonate, 0.17 g. of dodecyl thiol and 0.1 g. of potassium persulfate. The bottle was sealed under nitrogen with a two-hole crown cap containing a rubber septum. The bottle was placed into a safety screen in a thermostated water shaker bath at 50° C. Shaking was immediately commenced. After an 8-hour reaction time, the bottle was removed and 3 ml. of a methanolic "shortstop" solution of 0.024 g. hydroquinone and 0.036 g. of a oxidation stabilizer 2,6-di-t-butyl-4-methylphenol (DBMP) was added via a syringe. The bottle was again shaken for an additional 10 minutes, cooled, and then opened. This emulsion was steamed to remove residual isoprene monomer. The copolymer emulsion was next added to a stirred solution of 0.15 g. DBMP in 500 ml. of methanol. Approximately 20 g. of NaCl was then added to coagulate the emulsion. The resulting white crumb was isolated by using an 80 mesh screen and a dental rubber dam. The copolymer was washed 3 times with 500 ml. of distilled water and finally rinsed with 200 ml. of methanol. The elastomeric white crumb was placed in a vacuum oven at 40° C. for overnight drying. This process yielded 21.71 g. (80.4%) of the polymer containing 0.56 wt. % sulfur which is equivalent to 1.22 mole % NaSS in the copolymer.

EXAMPLE 2

Into 1250 ml. of heptane was dissolved 100 g. of an ethylene-propylene-5-ethylidene-2-norbornene copolymer, Vistalon 2504-20. The copolymer contained about 50 wt. % ethylene and about 5 wt. % ENB. It possessed a Mooney viscosity (ML, 1+8, 212° F.) of about 20. This polymer was produced through the hot extrusion breakdown of commercial 40 Mooney Vistalon 2504 and additionally had been dried on a hot rubber mill so that little water was contained in the polymer.

Acetyl sulfate was prepared as follows in the following proportions: Acetic anhydride (152.6 ml.=164.8 g.=1.62 moles) was cooled to $-30°$ C. Concentrated sulfuric acid (103.0 g.=0.998 mole) was added slowly so that temperature would not exceed 0° C. The neat reagent was about 4.84 molar. The viscous reagent was allowed to warm to 10° C., and an aliquot was taken for sulfonation.

To the polymeric cement, at room temperature, was added 10.3 ml. of a neat acetyl sulfate (50 mmoles). The cement developed a deep purple color, and was stirred for 60 minutes at room temperature. Reaction was terminated by the addition of 100 ml. isopropyl alcohol. The 0.5 g. of Antioxidant 2246 was added and dispersed. The acid form of the sulfonated polymer was isolated by steam stripping. The polymer was pulverized and washed in a Waring blender, and the wet crumb was dewatered and dried at about 120° F. on a two-roll rubber mill.

Five grams of the sulfonated EPDM was dissolved in 100 ml. of 95 toluene-5 methanol, and the solution was titrated with 0.1 N ethanolic NaOH to an Alizarin-Thymolphthalein end-point. Titration of the sulfonated EPDM resulted in the consumption of 41.6 millequivalents (meq.) of sodium hydroxide per 100 grams of sulfonated polymer. This corresponds to a reagent conversion of about 86%. Sulfur analysis on the sulfonated polymer showed it to contain 1.27 wt. % sulfur which corresponds to 39.7 meq. of sulfonate groups per 100 grams of sulfonated polymer. The correspondence of the titration data and the sulfur data is excellent.

EXAMPLE 3

Emulsion Copolymerization of Styrene and Sodium Styrene Sulfonate

A 2-liter reaction vessel was charged with 16.0 g. sodium lauryl sulfate, 10.0 g. of sodium styrene sulfonate, 600 ml. of distilled water, 250 g. styrene, 1.0 g. of dodecylthiol and 1.0 g. of potassium persulfate. Agitation was provided by an overhead stirrer and the system was carefully purged with nitrogen and kept under a nitrogen flush during the charging of the reactants. The reactor was heated to 50° C. for a 6-hour period. The reaction was marked with a vigorous exotherm. It was quenched with a methanolic hydroquinone solution. The copolymer was coagulated with methanol and sodium chloride. The fine solid was isolated by centrifugation. The isolated white solid (a 55% yield) contained 0.71% S by weight. A blank polymerization without NaSS present yielded approximately 0.2 wt. % S. Therefore, the copolymer contained 0.51% S or about 1.57 mol % NaSS.

EXAMPLE 4

Oil-based drilling muds were prepared using conventional laboratory methods. A typical mud was prepared by mixing 205.82 g. of No. 2 diesel oil, 34.76 g. Oil Faze (Magcobar), 1.5 g. Se11 and 1.5 g. DV33 Magcobar). To this mixture was added 10 g. of CaCl$_2$ in 21 ml. of water. The mud was weighted with 226.35 g. of Barite and then 4.4 g. of additional CaCl$_2$ were added. The sodium salt of the sulfonated styrene (~1.7 mol % sulfonate units) was added at a 2 lb/bbl. treat rate or 2.2 g. The NaSS isoprene copolymer (1.2 mol % NaSS) was added at a concentration of ½ lb/bbl. or 0.55 g. The mud was left overnight at room temperature to insure chemical equilibrium. Aliquots were aged at 150° F., 300° F. and 400° F. for 16 hours in pressurized cells. The cells were cooled to room temperature and then the rheological properties of the mud were measured on a Fann Model 35 viscometer at 115° F. The results for this test are shown in Table I, Column II.

EXAMPLE 5

A drilling mud was formulated according to the formulations of Example 4 wherein the NaSS/Isoprene component was omitted. The results as shown in Table I, Column 1, show a deterioration in properties, as compared to the formulations of Example 4.

TABLE I
RHEOLOGICAL PROPERTIES OF OIL-BASED DRILLING MUD FORMULATION

|       |          | SPS Control (a) | NaSS/IP (b) (1.2 mol % NaSS) SPS (a) |
|-------|----------|-----------------|---------------------------------------|
| R. T. | 600 (c)  | 63              | 107                                   |
|       | 300 (d)  | 41              | 77                                    |
|       | pV (e)   | 22              | 30                                    |
|       | YP (f)   | 19              | 47                                    |
|       | 0 gel (g)| 9               | 27                                    |
|       | 10 gel (h)| 18             | 49                                    |
| 150° F.| 600     | 68              | 107                                   |
|       | 300      | 39              | 71                                    |
|       | PV       | 29              | 36                                    |
|       | YP       | 10              | 35                                    |
|       | 0 gel    | 4               | 15                                    |
|       | 10 gel   | 17              | 26                                    |
| 400° F.| 600     | 75              | 99                                    |
|       | 300      | 46              | 60                                    |
|       | PV       | 29              | 39                                    |
|       | YP       | 17              | 21                                    |
|       | 0 gel    | 8               | 10                                    |
|       | 10 gel   | 26              | 27                                    |

(a) = 2 lb/bbl;
(b) = ½ lb/bbl;
(c) = 600 rpm viscosity;
(d) = 300 rpm viscosity;
(e) = plastic viscosity;
(f) = yield point;
(g) = 0 gel strength;
(h) = 10 min. gel strength.

What is claimed is:
1. An oil-based drilling mud which comprises:
   (a) an organic liquid immiscible with water;
   (b) about 1 to about 20 parts by weight of water per 100 parts by weight of the organic liquid;
   (c) about 20 to about 50 lb/bbl. of emulsifier;
   (d) weighting material necessary to achieve the desired density; and
   (e) about 0.25 to about 4.0 lb/bbl. of a mixture of a water insoluble neutralized sulfonated thermoplastic polymer and a water insoluble neutralized sulfonated elastomeric polymer, said neutralized sulfonated thermoplastic and elastomeric polymers each having about 5 to about 100 meq. of sulfonate groups per 100 grams of the neutralized sulfonated thermoplastic or elastomeric polymer.

2. A drilling mud according to claim 1 wherein the sulfonate groups of said neutralized sulfonated thermoplastic or elastomeric polymers are neutralized with a counterion selected from the group consisting of antimony, iron, aluminum, lead and Groups IA, IIA, IB and IIB of the Periodic Table of Elements.

3. A drilling mud according to claim 1 wherein the sulfonate groups of said neutralized sulfonated thermoplastic or elastomeric polymer are neutralized with a counterion selected from the group consisting of zinc, magnesium and sodium.

4. A drilling mud according to claim 1 wherein the sulfonate groups of said neutralized sulfonated thermoplastic or elastomeric polymer are neutralized with zinc counterion.

5. A drilling mud according to claim 1 wherein said neutralized sulfonated thermoplastic polymer is derived from polystyrene.

6. A drilling mud according to claim 1 wherein said neutralized sulfonated elastomeric polymer is derived from an EPDM terpolymer.

7. A drilling mud according to claim 1 wherein said neutralized sulfonated elastomeric polymer is isoprene co-sodium styrene sulfonate.

8. A drilling mud according to claim 1 wherein said neutralized sulfonated thermoplastic is derived from a polymer selected from the group consisting of polystyrene, poly-t-butyl-styrene, polychlorostyrene, polyalpha methyl styrene, polyvinyl toluene and co- or terpolymers of styrene with vinyl toluene, acrylonitrile, methyl methacrylate and butadiene.

9. A drilling mud according to claim 1 further including a wetting agent wherein said wetting agent is an alkylaryl sulfonate.

10. A drilling mud according to claim 1 wherein said weighting material is barite or barium sulfate.

11. A drilling mud according to claim 1 wherein the concentration level of said weighting material is sufficient to give said drilling mud a specific gravity of about 7 pounds per gallon to about 20 pounds per gallon.

12. A drilling mud according to claim 1 wherein said organic liquid is an oil.

13. A drilling mud according to claim 1 wherein said organic liquid is a hydrocarbon solvent.

14. A drilling mud according to claim 1 wherein said emulsifier is a magnesium or calcium soap of a fatty acid.

15. A drilling mud according to claim 1 which further includes a polar cosolvent.

16. A drilling mud according to claim 1 wherein said water is salt water.

17. A drilling mud according to claim 1 wherein the concentration of said water is about 3 to about 5 parts by weight per 100 parts by weight of said organic liquid.

18. A drilling mud according to claim 1 wherein said mixture of said neutralized sulfonated polymers is added as an emulsion.

19. A drilling mud according to claim 1, wherein said mixture of said neutralized sulfonated polymers is added as spray-dried powder.

20. A drilling mud according to claim 1 wherein said neutralized sulfonated elastomeric polymer is butadiene/sodium styrene sulfonate.

21. A drilling mud according to claim 1 wherein said neutralized sulfonated elastomeric polymer is butadiene/styrene/sodium styrene sulfonate.

22. A drilling mud according to claim 1 wherein said neutralized sulfonated elastomeric polymer is isoprene/styrene/sodium styrene sulfonate.

23. A drilling mud according to claim 1 wherein said neutralized sulfonated elastomeric polymer is chloroprene/styrene/sodium styrene sulfonate.

24. A drilling mud according to claim 1 wherein said organic liquid is a diesel oil.

* * * * *